Nov. 21, 1967    J. H. WALLACE    3,354,369
SYSTEM FOR CONTROLLING THE SPEED OR TORQUE
OF ONE OR MORE INDUCTION MOTORS
Original Filed Oct. 25, 1962    3 Sheets-Sheet 1
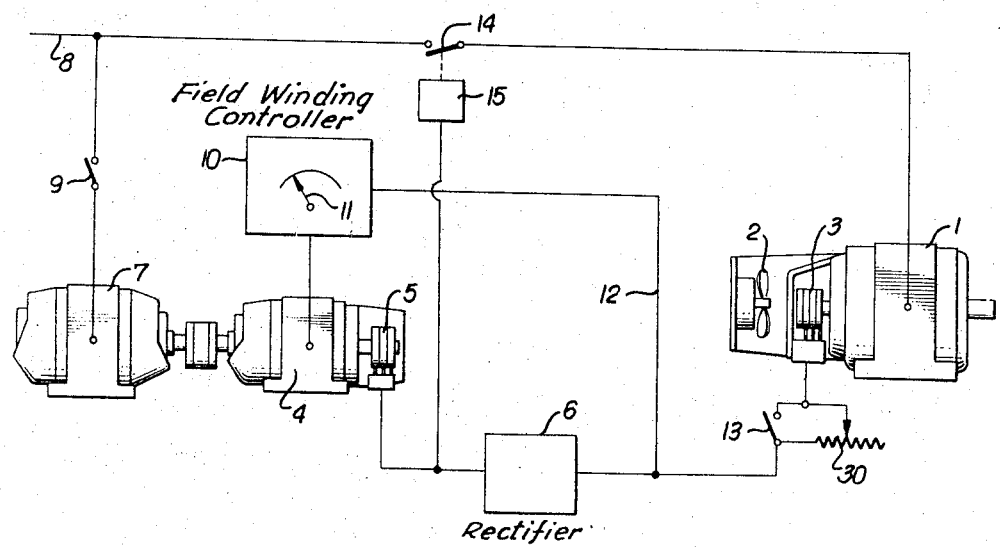
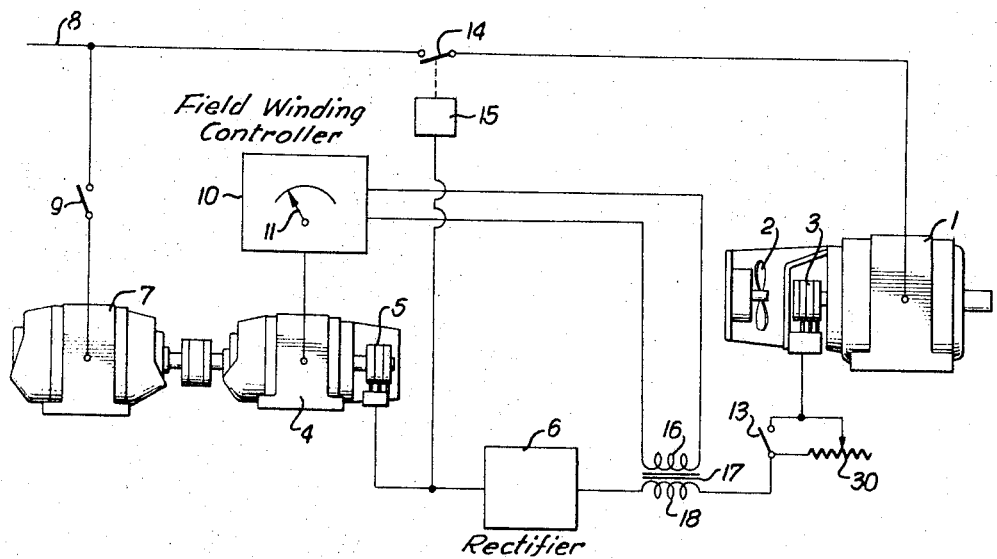
INVENTOR.
JOHN H. WALLACE
BY
Flam and Flam
ATTORNEYS.

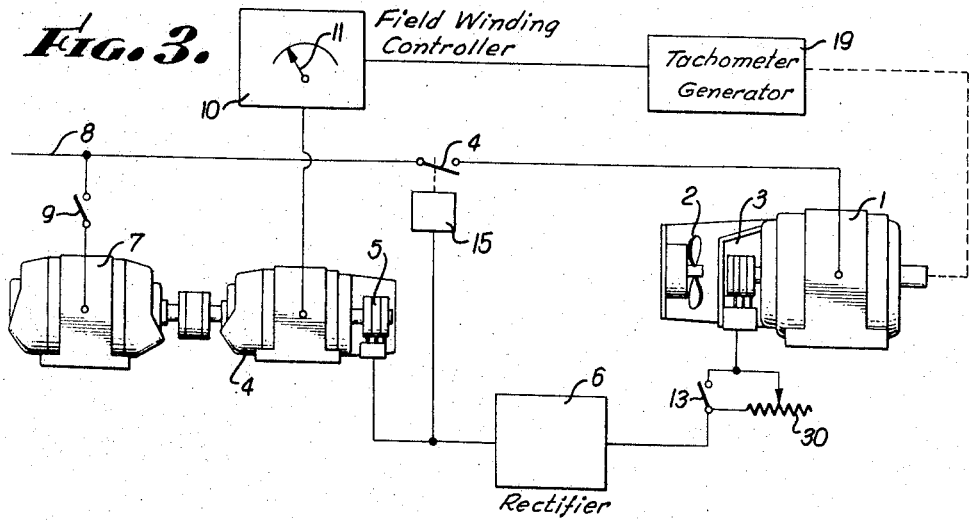
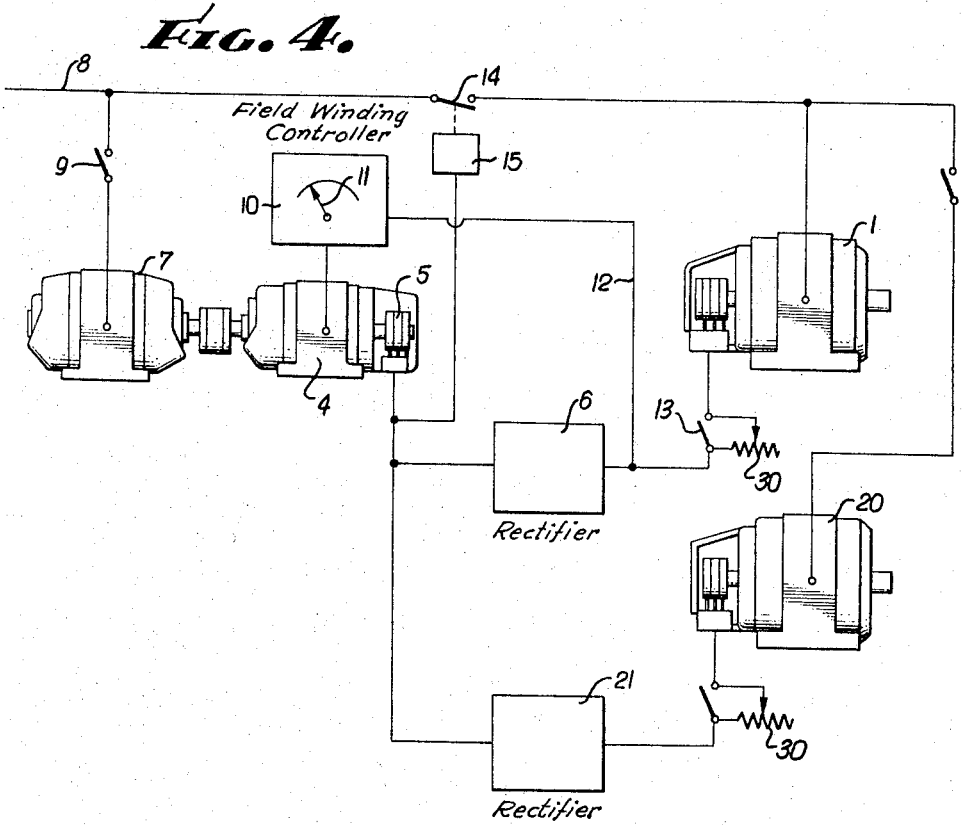

INVENTOR.
JOHN H. WALLACE
BY
Flam and Flam
ATTORNEYS.

United States Patent Office 3,354,369
Patented Nov. 21, 1967

3,354,369
SYSTEM FOR CONTROLLING THE SPEED OR TORQUE OF ONE OR MORE INDUCTION MOTORS
John H. Wallace, West Haven, Conn., assignor to Emerson Electric Co., a corporation of Missouri
Original application Oct. 25, 1962, Ser. No. 232,944, now Patent No. 3,250,974, dated May 10, 1966. Divided and this application Feb. 14, 1966, Ser. No. 590,442
2 Claims. (Cl. 318—197)

ABSTRACT OF THE DISCLOSURE

An induction motor 1 has a wound rotor externally accessible by the aid of slip rings 3. The rotor current operates a regenerative unit comprising a direct current machine 4 and an induction generator 8 through an interface device in the form of a rectifier 6. Adjustment of the magnetic field of the DC component 4 controls the operation of the motor 1 through the rotor circuit. A regulator incorporated in the controller 10 is controlled either by voltage (FIGS. 1, 3 and 4) to maintain the set speed constant or by current (FIG. 2) to maintain the torque constant.

---

This application is a division of Serial No. 232,944 filed October 25, 1962, now Patent No. 3,250,974 granted May 10, 1966.

*Background of the invention*

This invention relates to the operation of induction motors from a source of alternating current energy. More particularly, the invention is concerned with the control of speed of such motors over a wide range.

It is common for example to provide speed control within a limited range by adjusting the frequency of the alternator that supplies the motors. Such arrangements usually require variable ratio transmission mechanisms with consequent reduction in efficiency of the complete system.

It is one of the objects of this invention to provide a speed control system that automatically maintains the speed of the drive motor within narrow limits, and at a high efficiency; or automatically to provide adjustment of the speed in accordance with torque requirements.

The drive motor controlled by the novel system is provided with a wound rotor or secondary in place of the usual squirrel cage winding. It has been common to control the current flow in the rotor as by external adjustable resistors, the speed of the motor being correspondingly adjusted. It is evident that a serious loss of efficiency is effected.

It has also been suggested to conserve the electrical energy induced in the wound rotor by operating a motor generator set or regenerative unit for returning electrical energy to the mains supplying the drive motor.

It is another object of this invention to make it possible to use such a regenerative system while automatically controlling the system to provide a substantially constant speed output or optionally a substantially constant torque output of the drive motor and with highly satisfactory regulations; i.e., with relatively low variation from a set speed or torque upon variation in load.

It is another object of this invention to operate motors or relatively large size at a relatively high efficiency, and particularly by effective utilization of the electric power generated in the wound rotor.

It is another object of this invention to make it possible to operate a plurality of drive motors in parallel and to ensure substantially uniform operation thereof as regards speed and torque.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

*Brief description of the drawings*

FIGURES 1 to 6 inclusive are system block diagrams illustrating six different forms of the invention, the systems being adapted to utilize multiphase electrical energy, all represented by single lines on these diagrams.

*Detailed description*

Figure 5:
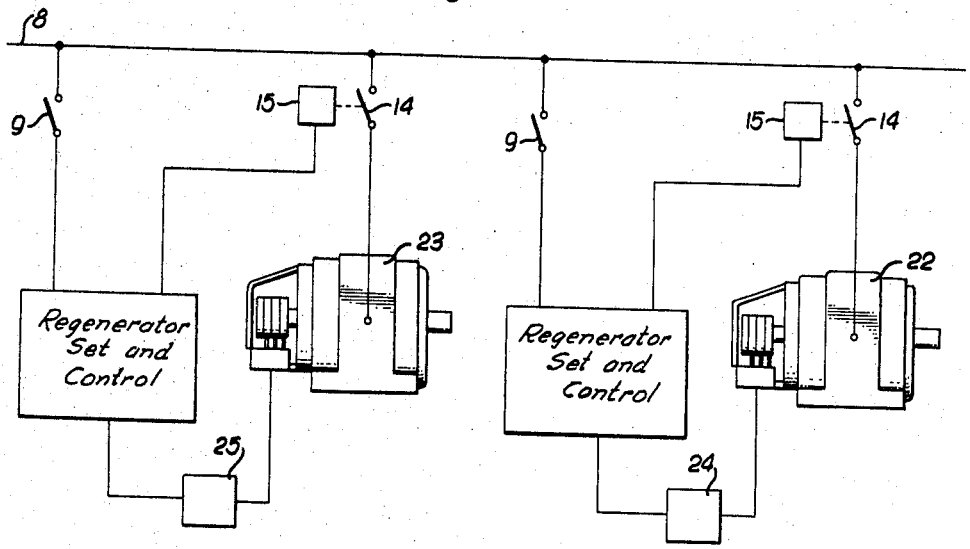

In FIGURE 1 a drive motor 1 is adapted to be coupled to a load. It is shown as cooled by a fan 2. It is an induction motor provided with a wound rotor having collector rings 3. These rings serve to transmit the electrical energy induced in the coils of the wound rotor, due to the difference in speed of the rotor and the rotating field produced by the stator windings.

Obviously, the electromotive force generated by the wound rotor corresponds to the slip of the motor. In order that the slip (and therefore the speed) be substantially constant, the electromotive force developed by the rotor must also be substantially constant. Thus, for each selected speed of the motor there is a definite value of the electromotive force generated in the rotor windings. For example, if the rotor is at standstill, and purely by transformer action the electromotive force generated in the rotor windings is, say, 100 volts, then at half speed it must be 50 volts. When there is load on the motor, of course, a substantial current flows through the rotor windings reducing slightly by terminal electromotive force of the rotor windings.

By ensuring that this electromotive force is maintained constant, then for equilibrium conditions the rotor speed must also attain a corresponding substantially constant value.

In order to maintain this electromotive force substantially constant, and thereby to maintain the speed substantially constant, an electromotive force is generated which opposes any increase in electromotive force generated in the rotor windings beyond that which corresponds to the desired speed. Thus, use is made of the counter-electromotive force developed by direct current dynamo-electric machine 4 having an armature with a commutator 5. The electrical energy developed in the rotor of induction motor 1 may be rectified by any standard rectifier 6. This rectified voltage is directly opposed by the potential difference across the commutator 5. The dynamo-electric machine 4 may be a direct current motor directly coupled to an induction generator 7. An induction generator may be a squirrel cage motor driven above its synchronous speed with the stator winding connected to a source of AC power of the correct frequency for the motor's synchronous speed. This induction generator may be connected to the source 8 by switch 9. This source is connected to the drive motor 1. Thus the induction generator 7 transmits the electrical energy of the rotor windings to the source 8, materially increasing the efficiency of the system.

The components 4 and 7 may be termed a regenerative unit.

The counter-electromotive force of machine 4 is controlled so as to match substantially, but not quite, the desired slip electromotive force of machine 1. The slip must conform to this setting of the counter-electromotive force. The drive motor 1 will then operate at a substantially set constant speed, corresponding to the counter-electromotive force of machine 4. The controlled excess of potential difference of the rotor winding over the counter-electromotive force permits enough current to flow through the wound rotor of machine 1 to provide the operating torque.

In this instance, the control of the counter-electromotive force is effected by adjusting the field excitation of machine 4.

In FIG. 1 a field winding controller 10 is arranged to adjust the excitation of the direct current machine 4 as by the aid of a manually adjustable control member 11. Each setting of control member 11 corresponds to a desired speed.

Due to the varying conditions of the load and the resistance drops in the system, this counter-electromotive force may drop below the desired amount. In order to compensate for this, regulation is provided as indicated by the line 12 in accordance with the input electromotive force impressed on the rectifier 6. Thus, when the counter-electromotive force of motor 4 falls below the set value, the regulating mechanism causes the field excitation to be increased until an equilibrium is again established. This regulating mechanism may be of any well-known type, such as an adjustable resistance in the field winding circuit of the machine 4, the adjustment being effected by variations in the input electromotive force.

If it is desired to control the drive motor 1 for loads that require a substantial slip, a circuit including and adjustable resistor structure 30 may be cut in by opening of the circuit controller 13.

The supply of electrical energy to the motor 1 is effected from mains 8 via a switch or circuit breaker 14. This circuit breaker 14 is so arranged that it will be closed only upon the attainment of a sufficient direct current voltage produced by the dynamo-electric machine 4. The switch 14 therefore is arranged to be closed when relay 15, connected across the commutator terminals of the machine 4, is sufficiently energized.

This control by aid of relay 15 prevents cutting in the motor 1 to the mains 8 while there is no substantial counter-electromotive force opposing the flow of current from the wound rotor on the motor 1 through the rectifier 6.

Accordingly, in starting the system the switch 9 is first closed. The member 7 of the regenerative unit then operates as an induction motor operating the machine 4 as a direct current generator. After this machine 4 comes up substantially to speed, the switch 14 is closed. After this starting period, the machine 4 acts as a motor, driving the induction generator 7, and returning power to lines 8.

While switch 14 is open, no electromotive force is generated in the rotor of motor 1. If switch 14 were closed before machine 4 is operative, the impedance to current flow from the induced electromotive force from the drive motor rotor would be low, hence a large current rush through the rectifier 6 would occur, causing heating and necessitating larger size rectifier units. When machine 4 is generating a DC voltage, the current flow through the rectifier 6 would be controlled by the counter-electromotive force of machine 4.

The efficiency of the system is maintained high due to the return flow of energy to the mains 8 from the induction generator 7. The speed can be kept within narrow limits by having the sensing connection 12 taken from the input side of the rectifier 6. Thus the sensing of the electromotive force developed by the rotor is accurate except for the relatively minor error due to the drop in the resistance of the rotor. By measuring the output electromotive force of the drive motor 1, rather than the output DC voltage of generator 4, errors are eliminated due to voltage drop in the conductors to the rectifier 6, in rectifier 6, in the brush and commutator of machine 4, and in the drop in the DC field winding. The regulation, therefore, can be as close as one or two percent.

In most instances the regenerative set consisting of elements 4 and 7 can be provided with the most desirable number of poles, such as two or four.

In the form shown in FIG. 2, the sensing circuit for the field winding controller 10 is that which responds to the current flowing in the wound rotor of the motor 1. For this purpose, as diagrammatically indicated, there is a secondary winding 16 of a transformer 17 having its primary winding 18 in series with one of the phases of the wound rotor. Under such circumstances, the controller 10 is regulated to produce a substantially constant rotor current which corresponds to substantially constant torque.

In order to provide even closer regulation than that obtainable by the system shown in FIG. 1, the tachometer generator 19 as shown in FIG. 3 can be used for sensing the speed of the motor 1. This tachometer then has its output operating upon the field winding control 10. In other respects the system operates in the same manner as described in connection with FIG. 1.

In FIG. 4 a plurality of drive motors 1 and 20 are shown as connected together to the output sides of the rectifiers 6 and 21. These two motors will then operate closely in union as determined by the setting of the field winding controller 10.

In FIG. 5, there is shown as alternative to the system for plural motor operation. Each drive motor 22 and 23 as shown in FIG. 5 may be connected to common mains 8; the rectifiers 24 and 25 are respectively connected to separate regenerator units. Each motor 22 and 23 thus has a control system similar in every respect to that illustrated in FIG. 1.

Figure 6:
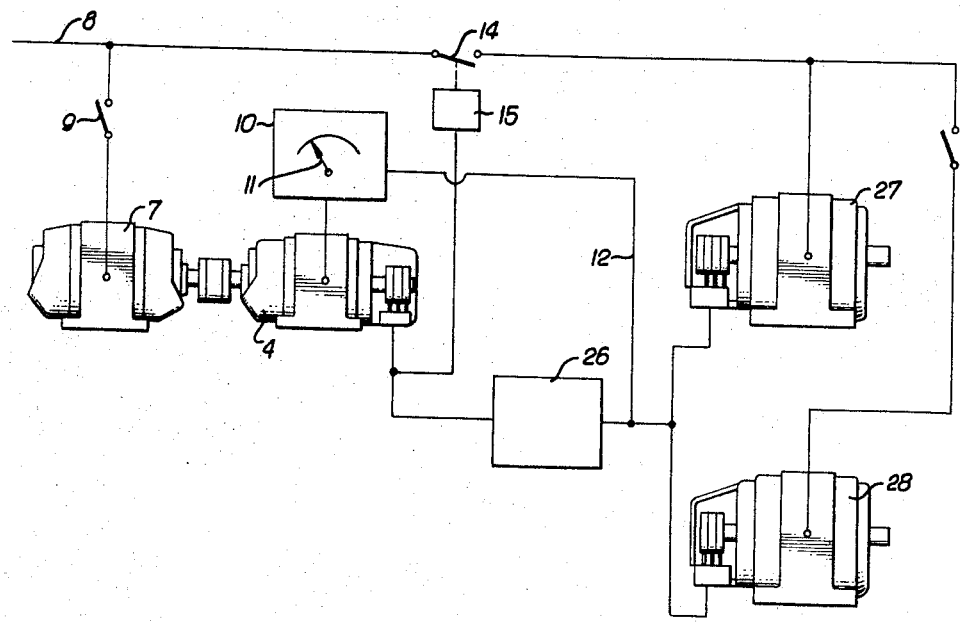

A single rectifier 26 as shown in FIG. 6 may be utilized to draw current from the secondary of each of the drive motors 27 and 28. If the rotors of motors 27 and 28 are aligned so that the rotor circuits are in phase, motors 27 and 28 will operate in exact synchronization and this synchronous speed will be determined by the setting of the voltage of their common rectifier 26.

The inventor claims:

1. In combination: a drive induction motor having a wound rotor; a rectifier fed from the rotor; a regenerative unit having a direct current dynamo-electric machine, a magnetic field for the direct current machine, and an alternating current machine acting optionally as an induction motor or as an induction generator and coupled to the direct current machine; said drive motor rotor being mechanically separate from the direct current machine; means connecting the output of the rectifier to the direct current machine; a common source of electrical energy capable of connection to the drive motor and to the alternating current machine; a regulator for the magnetic field; and means responsive to the wound rotor current for controlling said regulator whereby torque of said drive motor is maintained substantially at a set value.

2. The combination as set forth in claim 1 in which said current responsive means comprises a transformer having a primary winding serially connected to the wound rotor and having a secondary winding connected to said regulator.

References Cited

UNITED STATES PATENTS 3,231,805   1/1966   Shibata _____ 318—238

ORIS L. RADER, *Primary Examiner.*

G. Z. RUBINSON, *Assistant Examiner.*